US012603768B2

(12) United States Patent
Boucher et al.

(10) Patent No.: US 12,603,768 B2
(45) Date of Patent: Apr. 14, 2026

(54) SYSTEMS AND METHODS FOR PROVIDING AND MAINTAINING SECURE CLIENT-BASED PERMISSION LISTS

(71) Applicant: JPMORGAN CHASE BANK, N.A., New York, NY (US)

(72) Inventors: Ryan Boucher, Bear, DE (US); Aswathram Thirupulisamy Ravisankar, Wilmington, DE (US); Sujon Abul, New York, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 182 days.

(21) Appl. No.: 18/499,137

(22) Filed: Oct. 31, 2023

(65) Prior Publication Data

US 2025/0141672 A1    May 1, 2025

(51) Int. Cl.
H04L 9/08 (2006.01)
H04L 9/32 (2006.01)

(52) U.S. Cl.
CPC .......... H04L 9/0861 (2013.01); H04L 9/0825 (2013.01); H04L 9/3242 (2013.01)

(58) Field of Classification Search
CPC .... H04L 9/0861; H04L 9/0825; H04L 9/3242
See application file for complete search history.

(56) References Cited

U.S. PATENT DOCUMENTS 9,292,707 B1 * 3/2016 Fontecchio ........... H04L 9/0825
10,602,094 B1 * 3/2020 Longo ..................... G06F 21/10

2003/0163433 A1 * 8/2003 Lam .................... G06Q 20/3829
                                                                705/71
2005/0132182 A1 * 6/2005 Challener ............... G06F 21/57
                                                                713/150
2013/0326219 A1 * 12/2013 Badam .................. H04L 9/3268
                                                                713/168
2014/0075582 A1 * 3/2014 Hierro ................... H04L 63/062
                                                                726/30
2014/0095874 A1 * 4/2014 Desai .................. H04L 63/0815
                                                                713/168
2016/0078199 A1 * 3/2016 Moore ................. H04L 63/123
                                                                726/29
2017/0180367 A1 * 6/2017 Warren ................. H04L 63/061
2019/0207758 A1 * 7/2019 Cambou ............... H04L 9/0866
2019/0245701 A1 * 8/2019 Chen ...................... H04L 9/3236
2019/0279199 A1 * 9/2019 Sheets ................ G06Q 20/3227
2019/0371104 A1 * 12/2019 Suleiman ................ G06F 21/10
2022/0092193 A1 * 3/2022 Nijasure .............. G06F 21/602
2024/0275607 A1 * 8/2024 Yarabolu .............. H04L 9/3242

* cited by examiner

*Primary Examiner* — Darshan I Dhruv
(74) *Attorney, Agent, or Firm* — GREENBERG TRAURIG LLP

(57) ABSTRACT

In some aspects, the techniques described herein relate to a method including: receiving, at an entitlement service and from a client application, a request for an entitlement token; signing, by the entitlement service, a permission file with a private key from a public-private key pair; generating, by the entitlement service, a composite key using a public key from the public-private key pair; encrypting, by the entitlement service, the permission file using the composite key as an encryption key in a symmetric encryption function, wherein encrypting the permission file generates the entitlement token; and sending the entitlement token to the client application.

4 Claims, 4 Drawing Sheets

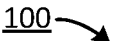
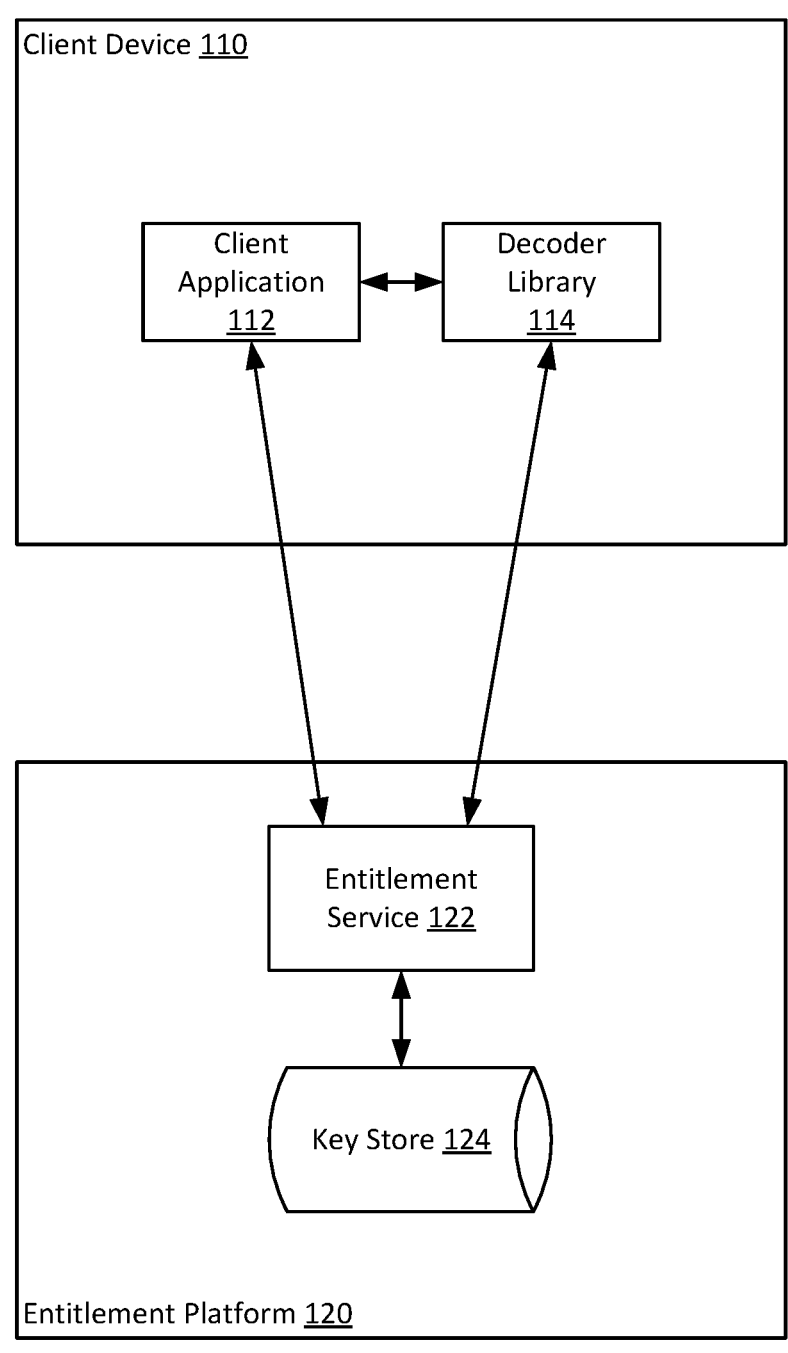
FIGURE 1

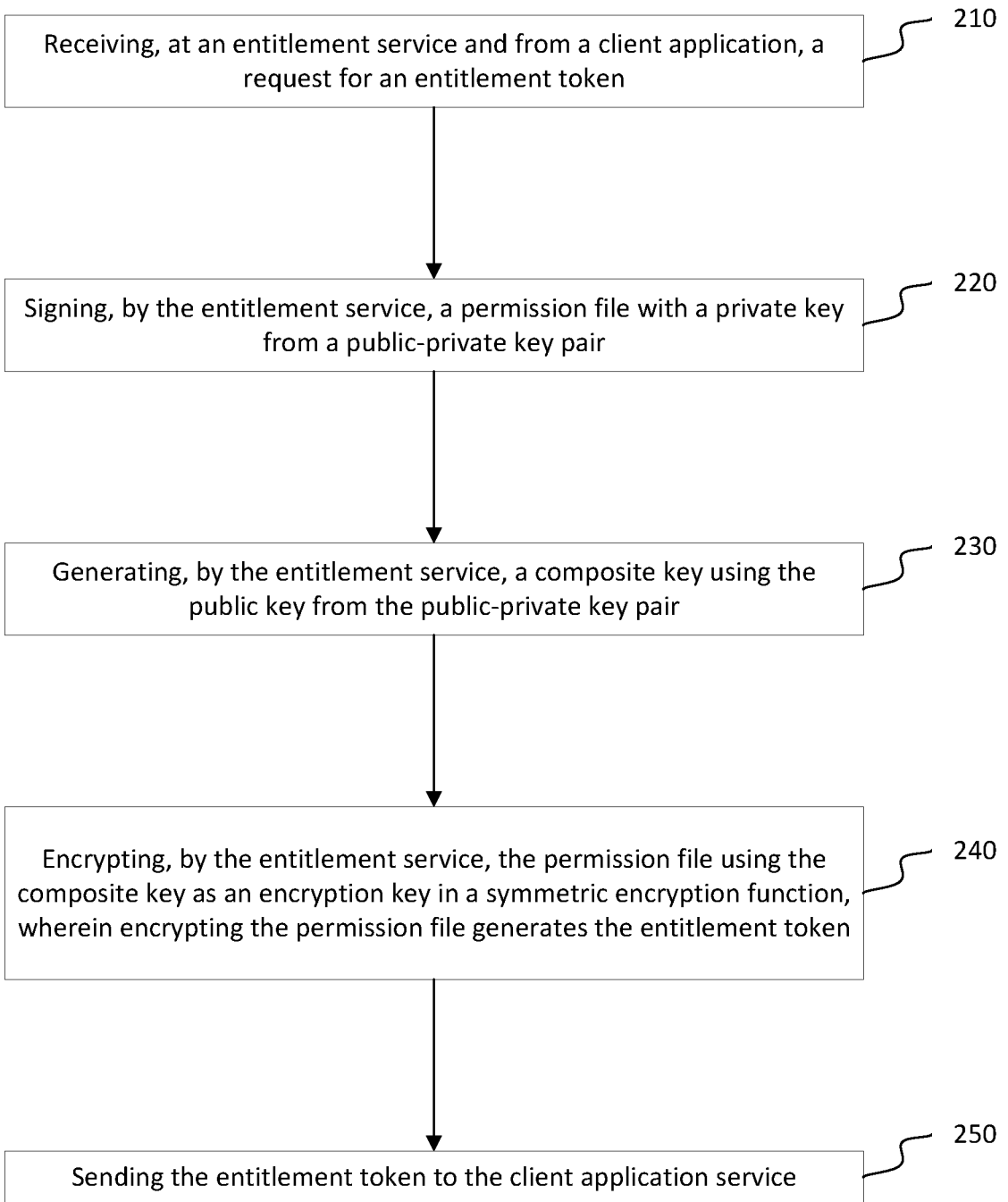

Receiving, at an entitlement service and from a client application, a request for an entitlement token    210

Signing, by the entitlement service, a permission file with a private key from a public-private key pair    220

Generating, by the entitlement service, a composite key using the public key from the public-private key pair    230

Encrypting, by the entitlement service, the permission file using the composite key as an encryption key in a symmetric encryption function, wherein encrypting the permission file generates the entitlement token    240

Sending the entitlement token to the client application service    250

FIGURE 2

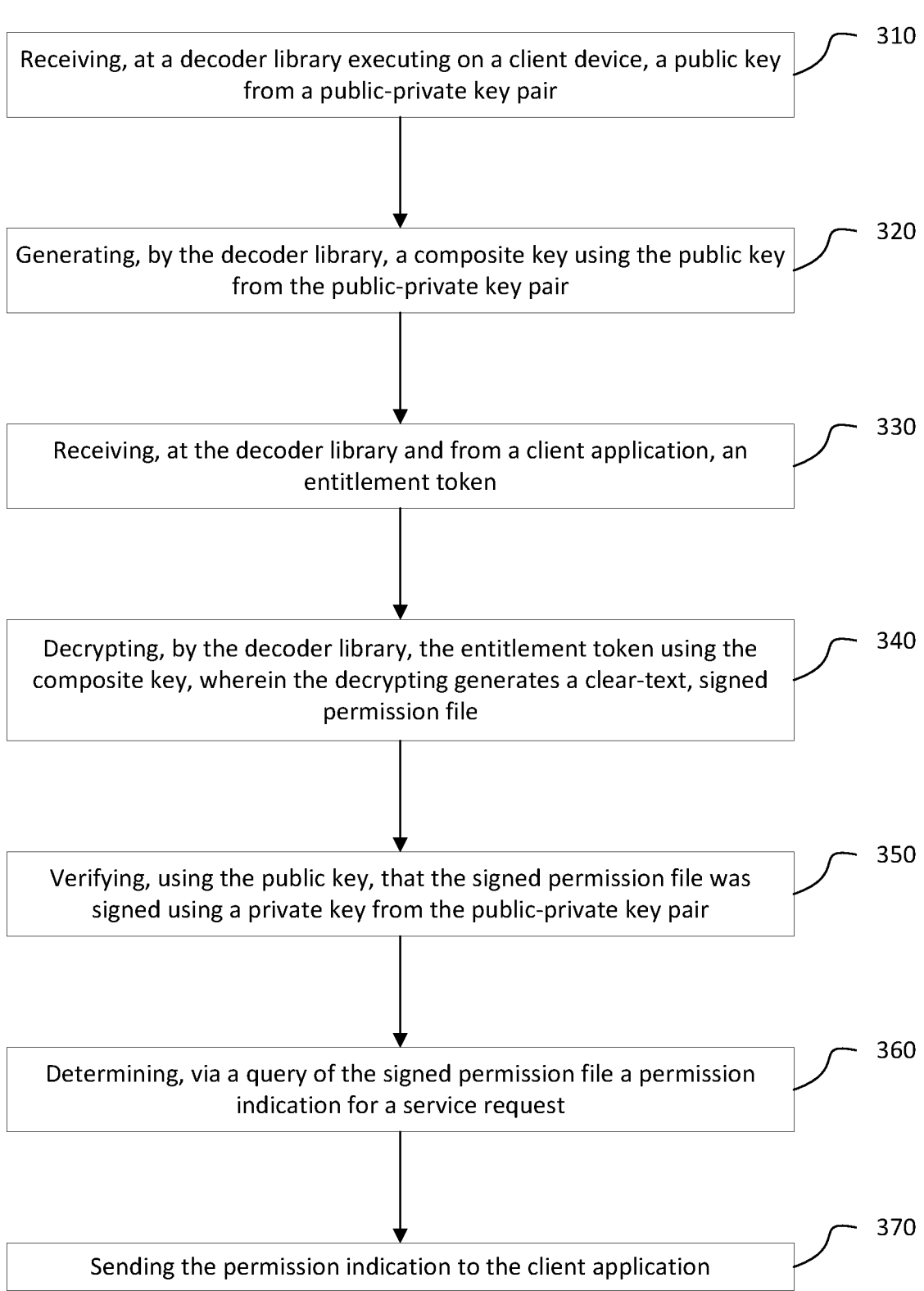

Receiving, at a decoder library executing on a client device, a public key from a public-private key pair — 310

Generating, by the decoder library, a composite key using the public key from the public-private key pair — 320

Receiving, at the decoder library and from a client application, an entitlement token — 330

Decrypting, by the decoder library, the entitlement token using the composite key, wherein the decrypting generates a clear-text, signed permission file — 340

Verifying, using the public key, that the signed permission file was signed using a private key from the public-private key pair — 350

Determining, via a query of the signed permission file a permission indication for a service request — 360

Sending the permission indication to the client application — 370

FIGURE 3

SYSTEMS AND METHODS FOR PROVIDING AND MAINTAINING SECURE CLIENT-BASED PERMISSION LISTS

BACKGROUND

1. Field of the Invention

Aspects generally relate to systems and methods for providing and maintaining secure client-based permission lists.

2. Description of the Related Art

Many client applications are configured to be in operative communication with an entitlement service that provides permissions for the client application. Often, an entitlement service executes remotely on a backend technology infrastructure of a providing organization. This makes a remote call across a network to the entitlement service necessary in order for the client application to retrieve applicable permissions. Moreover, these permissions often must be checked for each process requested by the application. Accordingly, an entitlement service may be called many times over a usage cycle, often for the same data (i.e., the same permissions or permission list). These types of network calls are costly in terms of processing overhead and network bandwidth, and can create high latency, and impact a user's workflow.

SUMMARY

In some aspects, the techniques described herein relate to a method including: receiving, at a decoder library executing on a client device, a public key from a public-private key pair; generating, by the decoder library, a composite key using the public key from the public-private key pair; receiving, at the decoder library and from a client application, an entitlement token; decrypting, by the decoder library, the entitlement token using the composite key, wherein decrypting the entitlement token generates a signed permission file, and wherein the signed permission file is in clear text; verifying, using the public key, that the signed permission file was signed using a private key from the public-private key pair; determining, via a query of the signed permission file a permission indication for a service request; and sending the permission indication to the client application.

In some aspects, the techniques described herein relate to a method, wherein generating the composite key includes providing the public key as input to a hashing function and receiving a first output from the hashing function.

In some aspects, the techniques described herein relate to a method, including: receiving, at the decoder library on the client device, a salt value.

In some aspects, the techniques described herein relate to a method, wherein generating the composite key includes appending the salt value to the first output from the hashing function.

In some aspects, the techniques described herein relate to a method, wherein generating the composite key includes providing the first output from the hashing function and the salt value appended to the first output from the hashing function to the hashing function as input, and receiving a second output from the hashing function.

In some aspects, the techniques described herein relate to a method, wherein the second output from the hashing function is converted into a byte array, and wherein the byte array is the composite key.

In some aspects, the techniques described herein relate to a method, wherein the first output from the hashing function is converted into a base64 string value.

In some aspects, the techniques described herein relate to a system including at least one computer including a processor and a memory, wherein the at least one computer is configured to: receive, at a decoder library executing on the at least one computer, a public key from a public-private key pair; generate, by the decoder library, a composite key using the public key from the public-private key pair; receive, at the decoder library and from a client application, an entitlement token; decrypt, by the decoder library, the entitlement token using the composite key, wherein decrypting the entitlement token generates a signed permission file, and wherein the signed permission file is in clear text; verify, using the public key, that the signed permission file was signed using a private key from the public-private key pair; determine, via a query of the signed permission file a permission indication for a service request; and send the permission indication to the client application.

In some aspects, the techniques described herein relate to a system, wherein generating the composite key includes providing the public key as input to a hashing function and receiving a first output from the hashing function.

In some aspects, the techniques described herein relate to a system, including: receiving, at the decoder library on the at least one computer, a salt value.

In some aspects, the techniques described herein relate to a system, wherein generating the composite key includes appending the salt value to the first output from the hashing function.

In some aspects, the techniques described herein relate to a system, wherein generating the composite key includes providing the first output from the hashing function and the salt value appended to the first output from the hashing function to the hashing function as input, and receiving a second output from the hashing function.

In some aspects, the techniques described herein relate to a system, wherein the second output from the hashing function is converted into a byte array, and wherein the byte array is the composite key.

In some aspects, the techniques described herein relate to a system, wherein the first output from the hashing function is converted into a base64 string value.

In some aspects, the techniques described herein relate to a non-transitory computer readable storage medium, including instructions stored thereon, which instructions, when read and executed by one or more computer processors, cause the one or more computer processors to perform steps including: receiving, at a decoder library executing on a client device, a public key from a public-private key pair; generating, by the decoder library, a composite key using the public key from the public-private key pair; receiving, at the decoder library and from a client application, an entitlement token; decrypting, by the decoder library, the entitlement token using the composite key, wherein decrypting the entitlement token generates a signed permission file, and wherein the signed permission file is in clear text; verifying, using the public key, that the signed permission file was signed using a private key from the public-private key pair; determining, via a query of the signed permission file a permission indication for a service request; and sending the permission indication to the client application.

In some aspects, the techniques described herein relate to a non-transitory computer readable storage medium, wherein generating the composite key includes providing the public key as input to a hashing function and receiving a first output from the hashing function.

In some aspects, the techniques described herein relate to a non-transitory computer readable storage medium, including: receiving, at the decoder library on the client device, a salt value.

In some aspects, the techniques described herein relate to a non-transitory computer readable storage medium, wherein generating the composite key includes appending the salt value to the first output from the hashing function.

In some aspects, the techniques described herein relate to a non-transitory computer readable storage medium, wherein generating the composite key includes providing the first output from the hashing function and the salt value appended to the first output from the hashing function to the hashing function as input, and receiving a second output from the hashing function.

In some aspects, the techniques described herein relate to a non-transitory computer readable storage medium, wherein the second output from the hashing function is converted into a byte array, and wherein the byte array is the composite key.

In some aspects, the techniques described herein relate to a method including: receiving, at an entitlement service and from a client application, a request for an entitlement token; signing, by the entitlement service, a permission file with a private key from a public-private key pair; generating, by the entitlement service, a composite key using a public key from the public-private key pair; encrypting, by the entitlement service, the permission file using the composite key as an encryption key in a symmetric encryption function, wherein encrypting the permission file generates the entitlement token; and sending the entitlement token to the client application.

BRIEF DESCRIPTION OF THE DRAWINGS

FIG. 1 is a block diagram of a system for providing and maintaining secure client-based permission lists, in accordance with aspects.

FIG. 2 is a logical flow for providing and maintaining secure client-based permission lists, in accordance with aspects.

FIG. 3 is a logical flow for providing and maintaining secure client-based permission lists, in accordance with aspects.

DETAILED DESCRIPTION

Figure 4:
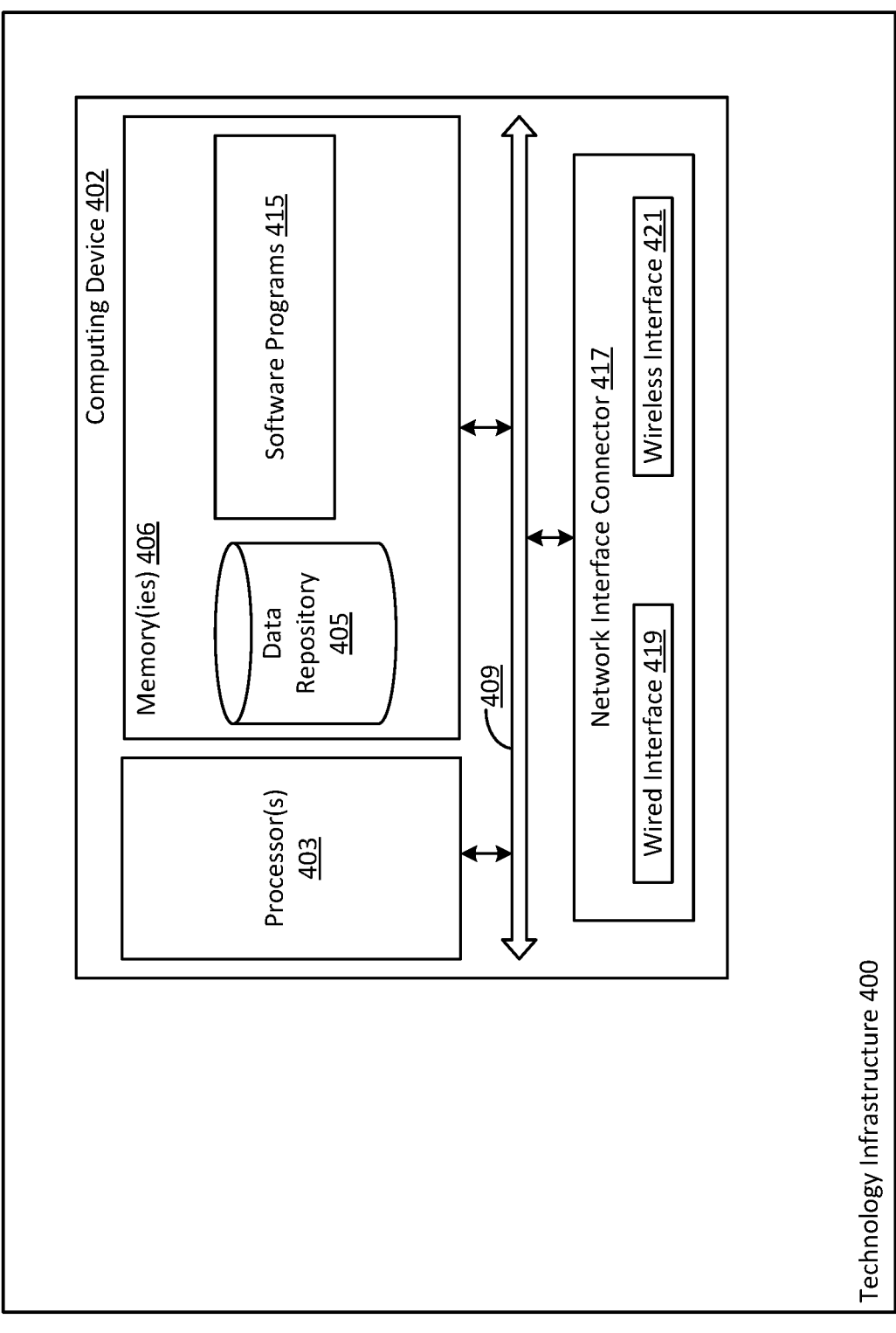
FIG. 4 is a block diagram of a technology infrastructure and computing device for implementing certain aspects of the present disclosure, in accordance with aspects.

Aspects generally relate to systems and methods for providing and maintaining secure client-based permission lists.

Aspects described herein may provide a secure entitlement token to a client application that allows a client application to locally determine permissions for service requests by executing a check or query of a permission list included in an entitlement token. Aspects may provide security in the form of a digital signature applied to a permissions file to generate an entitlement token and symmetric encryption of the entitlement token. Aspects may further include a software library (e.g., a decoder library)

which may be incorporated into a client application and that may provide methods that may be called by the client application when permissions for a service request initiated by the client application must be checked prior to the service request being executed. Further, aspects may provide a procedure for handling key rotation scenarios.

In accordance with aspects an entitlement token may include a list of permissions for service requests that are executable or callable (i.e., requestable) by a client application. As used herein a service request is any process or procedure provided by a client application. A service request may require that a particular permission be configured in order for the service request to fully execute. A service request may be initiated by a user of a client application. A service request may provide processing that facilitates any necessary or desirable calculation, data manipulation, a create, read, update, delete (CRUD) operation, and application programming interface (API) method call, or any other process or procedure that may be executed by a client application in fulfillment of the client application's designated purpose. A client application may be configured as a client in a client-server architecture, where a client may initiate service requests that are carried out by the client application, by a service that is hosted on a server provisioned on a providing organization's backend technology infrastructure, or partially by the client application and partially by a backend service.

As used herein, a permission item may be a permission that is associated with both a user and a service request, and that is included in a permission list that is associated with a client application. A permission list that is associated with a client application may include a permission item for each service request that is provided by the client application. In some aspects, a permission list may include a permission item for each user profile that is configured to access/use a client application. A permission list, at least, includes data that may be queried to determine whether a user profile, a system profile, or some other profile that initiates (whether directly or indirectly) a service request on a client application has been assigned an appropriate permission indication to execute the initiated service request.

For instance, each permission item in a permission list may include a reference to a user profile, a reference to an executable process or procedure (i.e., a service request), and a permission indicator. In an exemplary aspect, a permission item in an permission list may take the form: user X may execute service process Y=true. In the exemplary permission item "user X" may be a reference to a user profile (which represents a user of a client application), "service process Y" may be a reference to an executable or callable service process (i.e., a service request), and "true" may be the permission indicator. In some aspects, a permission item may reference an object such as an electronic file or folder. In some aspects, a permission indicator may be binary (i.e., true or false, yes or no, etc.). In other aspects, a permission indicator may be configured to accept many values (i.e., a read permission, a write permission, a create permission, an update permission, etc.).

In accordance with aspects, an entitlement token may be generated from a permission list (including permission items) that is configured at, and stored by, an entitlement service. An entitlement service may execute on a technology backend of an implementing organization. An entitlement service may publish application programming interface (API) methods that allow client applications (including a decoder library) to request an entitlement token. An entitlement service may, upon request from a client application, generate an entitlement token that includes a permission list for service requests that are executable or callable by the client application. A permission list may be created and stored in the form of a file, such as a JavaScript object notation (JSON) formatted file (any suitable file format may be used, however). Such a file may be referred to herein as a permissions file. An entitlement service may access and use a permission file in an entitlement token generation process.

In an exemplary entitlement token generation process, an entitlement service may receive a request (e.g., an API call of an API method published by the entitlement service) from a client application for an entitlement token associated with the client application. In response to a request for an entitlement token, an entitlement service may retrieve a permission file associated with the requesting client application. In some aspects, an API method for requesting an entitlement token may require that the requesting application provide an application identifier as a parameter or argument of the method. An entitlement service may use an application identifier as a lookup key to retrieve a permission file that is associated with a requesting application.

In accordance with aspects, an entitlement service may have access to a pair of cryptographic keys including a public key and a corresponding private key. This key pair may be stored securely where it is accessible by the entitlement service, e.g., at a secure key store that the entitlement service has access to. In an entitlement token generation process, an entitlement service may retrieve a permission file that is associated with a requesting client application and sign the permission file with the private key from a cryptographic key pair, thereby creating a digitally signed permission file.

In accordance with aspects, as a step in an entitlement token generation process, an entitlement service may generate a composite key that may be used in a symmetric encryption scheme for encrypting a signed entitlement token. A composite key creation process may include providing, as a first input to a hashing function (sometime referred to as a "one-way" function), the public key from the cryptographic key pair. An exemplary hashing function is the SHA-256 hashing function. Any suitable hashing function may be used, however. The output of the hashing algorithm (i.e., a first output), which may be, e.g., a fixed-size hexadecimal string value, may then have a cryptographic salt value appended to it. A salt value is a random value (e.g., a hexadecimal string value) that may be used as (additional) input to a hashing algorithm. An entitlement service may randomly generate and/or store a salt value. The salt value may be appended to the first output of the hashing algorithm. In some aspects, the first output of the hashing algorithm may be converted into a base64 string value before a salt value is appended to it. Then, the first output form the hashing function and the appended salt value may be provided as a second input to the hashing function. This second input produces a second output from the hashing algorithm. The second output may be converted into a byte array that is referred to herein as a composite key.

In accordance with aspects, an entitlement service may use a composite key as an encryption/decryption key in a symmetric encryption process that encrypts a signed permission file. An entitlement service may encrypt a signed permission file with a symmetric encryption process using a generated composite key as an encryption key. Such an encryption process produces a signed, encrypted permission file referred to herein as an entitlement token.

Aspects herein may provide a decoder library that may be incorporated into a client application. The decoder library may be configured to request, and decrypt and entitlement token. In accordance with aspects, a decrypted entitlement token generates, through the decryption process, a signed permission file. A decoder library may verify that a signed permission file was properly signed by a private key stored at an entitlement service by using the public key that corresponds to the private key. An exemplary decoder library may be a software library and may take the form of a software development kit (SDK) that may be incorporated into various client applications. In some aspects, the library may run as a local service in the background or system tray of a client device that executes the client application and decoder library. In other aspects a decoder library may execute in the runtime environment of a corresponding client application.

Upon initialization of the decoder library, either at startup of a client device or startup of a corresponding client application, the decoder library may request, from an entitlement service the public key of a public/private key pair used by the entitlement service in an entitlement token generation service. The decoder library may further request a salt value used in an entitlement token generation service. Upon receipt of the public key and the salt value from an entitlement service (e.g., as return values from an API method call), the decoder library may be configured to regenerate a composite key from the received public key and salt value using the same steps as the entitlement service uses (as described above) to generate the composite key. That is, the decoder service may use the received public key as input to a hashing algorithm (the same hashing function that the entitlement service used, e.g., the SHA-256 hashing function) to produce a first output. The first output may be converted into a base64 string (if the entitlement service performs this step). The salt value may be appended to the first output. The first output and appended salt value may then be used as a second input to the hashing function, to produce a second out, which is a composite key that matches the composite key that a corresponding entitlement service generated.

Moreover, a client application associated with the decoder library may, at startup or as required, request and/or receive an entitlement token from a entitlement service. Instead of sending a request for a permission check/query to a remote entitlement service, as is conventionally done, the client application may make a local call to the decoder library to check for appropriate permissions when a user initiates a service process with a service request. In an exemplary aspect, a client application may be configured to make an API method call to an API method published by a decoder library. The API method may take an entitlement token that the client application receives from an entitlement service as a parameter of the API method. Other parameters may include a reference to a use profile that initiated the service request (such as a unique identifier of the user profile) and a reference to the requested service request (such as a unique identifier of the service request/process). In some aspects, the decoder library may store a copy of the received entitlement token so that it does not need to be passed to the decoder library with every API call for a permission check.

Upon receiving a method call for a permission check the decoder library may use its generated composite key to decrypt a received entitlement token. Once the entitlement token is decrypted (thereby producing a signed permission file), the decoder service may verify, as authentic (i.e., as signed by the correct private key—the private key stored and used by a corresponding entitlement service) the signed permission file using the public key received from the entitlement service for verification. If the signed entitlement token is positively verified as authentic, then the decoder library may perform a query of the file to determine a permission indication for a user profile and a requested service request received at the decoder library. Upon determining a permission indication from the verified permission file, the decoder library may send, in a response communication to the client application, the determined permission indication. Because the request for a permission check is performed locally at a client device, network traffic generated from querying an entitlement service for various permissions related to service requests by client applications may be greatly reduced or eliminated.

In accordance with aspects, the techniques described herein may further provide an efficient solution to rotation (i.e., replacement) of a cryptographic key pair. Key pairs may periodically need to be replaced due to security reasons, such as the passage of time, compromised keys, etc. Key pair rotation may initiate at an entitlement service or a security service from which an entitlement service receives its key pair for entitlement token generation. The described techniques provide an efficient method of key rotation, where only the key pair used by an entitlement service need be manually updated. This method may allow for frictionless key rotation that, in turn, may allow for more frequent key rotation that may result in greater security in a technology infrastructure of an implementing organization.

As noted above, because the public key of a relevant key pair is requested/received at initiation of the decoder service, all that may be required after a key rotation at the corresponding entitlement service is a re-initiation (i.e., a restart) of the decoder library. A re-initiation of the decoder service may request and receive an updated public key from an entitlement service. The updated public key received at the decoder library may be used to both decrypt and verify an encrypted and signed entitlement token. Aspects of a decoder library, however, may be configured with a re-request procedure that is initiated upon failure of the decryption process. A re-request procedure may make a key rotation event more or completely transparent to end users.

For instance, an entitlement token may be received by a client application at some point after initialization of its corresponding decoder library. Due to a key rotation at an entitlement service, the received entitlement token may have been encrypted using a composite key that was not generated using the public key earlier retrieved by the decoder library. That is, a key rotation may have been completed after a decoder library last retrieved a public key from an entitlement service (e.g., at startup). Accordingly, the composite key constructed at the decoder library from the earlier retrieved public key will not decrypt the encrypted entitlement token. In this scenario, upon failure of the decryption process, the library may be configured to execute a re-request procedure. The re-request procedure may make a request to the entitlement service for the latest public key. The re-request service may then initiate the composite key generation procedure using the newly received public key and the original salt value (i.e., the salt value may remain constant). Thereafter, the decoder library may execute the decryption procedure to decrypt a received entitlement token that was encrypted at an entitlement service subsequent to a key pair rotation at the entitlement service.

In accordance with aspects, some key rotation events may require retrieval of a new salt value as a heighted security feature. For instance, if a salt value is determined to be compromised, then the salt value may be replaced at the entitlement service, and the new salt value may be retrieved by a decoder library at initiation. In some aspects if a re-request procedure fails (either once, or a pre-determined number of times), a decoder library may be configured to automatically restart and proceed through the initiation process, or may be configured to display an alert to an end user indicating a decryption error and requesting a manual restart and subsequent re-initiation of the decoder library.

FIG. 1 is a block diagram of a system for providing and maintaining secure client-based permission lists, in accordance with aspects. System 100 includes client device 110 and entitlement platform 120. Client device 110 executes client application 112 and decoder library 114. Entitlement platform 120 includes entitlement service 122 and key store 124. Entitlement platform 120 and/or client device 110 may be part of an implementing organization's technology infrastructure.

In accordance with aspects, entitlement service 122 may be configured to generate an entitlement token for client application 112. Entitlement service 122 may execute an entitlement token generation process using a public/private key pair retrieved from key store 124. In an entitlement token generation process, entitlement service 122 may receive (e.g., via a call to an API method published by entitlement service 122) a request from client application 112 for an entitlement token associated with client application 112. The request may include an application identifier that uniquely identifies client application 112.

Entitlement service 122 may sign, using the private key of a key pair retrieved from key store 124, a permission file associated with client application 112 to generate a signed permission file. Moreover, entitlement service 122 may execute a composite key generation procedure, as discussed in more detail, herein, to generate a composite key using the public key from the retrieved hey pair and a stored salt value. Entitlement service 122 may then encrypt, with a symmetric encryption process, the signed permission file using the composite encryption key generated from the public key, thereby producing an entitlement token. Entitlement service 122 may send the entitlement token to client application 112 via, e.g., a response to an API method call.

In accordance with aspects, decoder library 114 may, at initialization, request the public key from the key pair and the stored salt value from entitlement service 122. Upon receipt of the public key and salt value, decoder library 114 may construct the composite key using the public key and the salt value, as discussed in more detail, herein.

Decoder library 114 may receive a request for a permission check for a service request from client application 112. The request may be, e.g., a call to an API method published by decoder library 114. The request may include the entitlement token received from entitlement service 122, a reference to a service request and a reference to a user profile (or other permissioned profile). Decoder library 114 may decode the received entitlement token using the constructed composite key to generate (i.e., transform into clear text) the signed permission file that was encrypted by entitlement service 122. Decoder library 114 may then verify, using the public key retrieved from entitlement service 122, that the signed permission file was properly signed with the corresponding private key from the key pair. Once the signed permission file is verified as authentic with the public key, decoder library 114 may query the permission file to determine a permission indication associated with the received service request and profile references. A permission indication may be returned to client application 112, and client application 112 may execute or not execute the requested service request based on the permission indication.

In accordance with aspects, if a decryption procedure at decoder library 114 fails, decoder library 114 may initiate a re-request procedure, as described in more detail herein, to request a latest version of public key after a key pair rotation by entitlement service 122.

FIG. 2 is a logical flow for providing and maintaining secure client-based permission lists, in accordance with aspects.

Step 210 includes receiving, at an entitlement service and from a client application, a request for an entitlement token.

Step 220 includes signing, by the entitlement service, a permission file with a private key from a public-private key pair.

Step 230 includes generating, by the entitlement service, a composite key using a public key from the public-private key pair.

Step 240 includes encrypting, by the entitlement service, the permission file using the composite key as an encryption key in a symmetric encryption function, wherein encrypting the permission file generates the entitlement token.

Step 250 includes sending the entitlement token to the client application service.

FIG. 3 is a logical flow for providing and maintaining secure client-based permission lists, in accordance with aspects.

Step 310 includes receiving, at a decoder library executing on a client device, a public key from a public-private key pair.

Step 320 includes generating, by the decoder library, a composite key using the public key from the public-private key pair.

Step 330 includes receiving, at the decoder library and from a client application, an entitlement token.

Step 340 includes decrypting, by the decoder library, the entitlement token using the composite key, wherein decrypting generates a clear-text, signed permission file.

Step 350 includes verifying, using the public key, that the signed permission file was signed using a private key from the public-private key pair.

Step 360 includes determining, via a query of the signed permission file a permission indication for a service request.

Step 370 includes sending the permission indication to the client application.

FIG. 4 is a block diagram of a technology infrastructure and computing device for implementing certain aspects of the present disclosure, in accordance with aspects. FIG. 4 includes technology infrastructure 400. Technology infrastructure 400 represents the technology infrastructure of an implementing organization. Technology infrastructure 400 may include hardware such as servers, client devices, and other computers or processing devices. Technology infrastructure 400 may include software (e.g., computer) applications that execute on computers and other processing devices. Technology infrastructure 400 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 400 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 400 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 400 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper of fiber optic wire/cable) that forms a physical computer network. Routers, switches, and firewalls may also have "wireless" interfaces that facilitate data transmissions via radio waves. A computer network included in technology infrastructure 400 may include both wired and wireless components and interfaces and may interface with servers and other hardware via either wired or wireless communications. A computer network of technology infrastructure 400 may be a private network but may interface with a public network (such as the internet) to facilitate operative communication between computers executing on technology infrastructure 400 and computers executing outside of technology infrastructure 400.

FIG. 4 further depicts exemplary computing device 402. Computing device 402 depicts exemplary hardware that executes the logic that drives the various system components described herein. Servers and client devices may take the form of computing device 402. While shown as internal to technology infrastructure 400, computing device 402 may be external to technology infrastructure 400 and may be in operative communication with a computing device internal to technology infrastructure 400.

In accordance with aspects, system components such as an entitlement service, a key store, a client application, a decoder library, client devices, servers, various database engines and database services, and other computer applications and logic may include, and/or execute on, components and configurations the same, or similar to, computing device 402.

Computing device 402 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 402 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
receiving, at a decoder library executing on a client device, a public key from a public-private key pair and a salt value;
generating, by the decoder library, a composite key using the public key from the public-private key pair, wherein generating the composite key includes providing a first output from a hashing function by hashing the public key as an input, wherein generating the composite key includes appending the salt value to the first output from the hashing function and providing the first output from the hashing function and the salt value appended to the first output from the hashing function to the hashing function as input, and receiving a second output from the hashing function, wherein the second output from the hashing function is converted into a byte array, and wherein the byte array is the composite key;
receiving, at the decoder library and from a client application, an encrypted entitlement token;
decrypting, by the decoder library, the encrypted entitlement token using the composite key as a symmetric key, wherein decrypting the encrypted entitlement token generates a signed permission file, and wherein the signed permission file is in clear text;
verifying, using the public key, that the signed permission file was signed using a private key from the public-private key pair;
determining, via a query of the signed permission file a permission indication for a service request; and
sending the permission indication to the client application.

2. The method of claim 1, wherein the first output from the hashing function is converted into a base64 string value.

3. A system comprising at least one computer including a processor and a memory, wherein the at least one computer is configured to:
receive, at a decoder library executing on the at least one computer, a public key from a public-private key pair and a salt value;
generate, by the decoder library, a composite key using the public key from the public-private key pair, wherein generating the composite key includes providing a first output from a hashing function by hashing the public key as an input, wherein generating the composite key includes appending the salt value to the first output from the hashing function and providing the first output from the hashing function and the salt value appended to the first output from the hashing function to the hashing function as input, and receiving a second output from the hashing function, wherein the second output from the hashing function is converted into a byte array, and wherein the byte array is the composite key;
receive, at the decoder library and from a client application, an encrypted entitlement token;
decrypt, by the decoder library, the encrypted entitlement token using the composite key as a symmetric key, wherein decrypting the encrypted entitlement token generates a signed permission file, and wherein the signed permission file is in clear text;
verify, using the public key, that the signed permission file was signed using a private key from the public-private key pair;
determine, via a query of the signed permission file a permission indication for a service request; and
send the permission indication to the client application.

4. A non-transitory computer readable storage medium, including instructions stored thereon, which instructions, when read and executed by one or more computer processors, cause the one or more computer processors to perform steps comprising:
receiving, at a decoder library executing on a client device, a public key from a public-private key pair and a salt value;
generating, by the decoder library, a composite key using the public key from the public-private key pair, wherein generating the composite key includes providing a first output from a hashing function by hashing the public key as an input, wherein generating the composite key includes appending the salt value to the first output from the hashing function and providing the first output from the hashing function and the salt value appended to the first output from the hashing function to the hashing function as input, and receiving a second output from the hashing function, wherein the second output from the hashing function is converted into a byte array, and wherein the byte array is the composite key;

receiving, at the decoder library and from a client application, an encrypted entitlement token;

decrypting, by the decoder library, the encrypted entitlement token using the composite key, wherein decrypting the encrypted entitlement token generates a signed permission file, and wherein the signed permission file is in clear text;

verifying, using the public key, that the signed permission file was signed using a private key from the public-private key pair;

determining, via a query of the signed permission file a permission indication for a service request; and sending the permission indication to the client application.

\* \* \* \* \*